US011466661B2

(12) United States Patent
Warzok (10) Patent No.: US 11,466,661 B2
(45) Date of Patent: Oct. 11, 2022

(54) SHEAR WEB FOR STIFFENING A WIND TURBINE ROTOR BLADE (71) Applicant: Nordex Energy SE & Co. KG, Hamburg (DE)

(72) Inventor: Felix Warzok, Hamburg (DE)

(73) Assignee: Nordex Energy SE & Co. KG, Hamburg (DE)

( * ) Notice: Subject to any disclaimer, the term of this patent is extended or adjusted under 35 U.S.C. 154(b) by 0 days.

(21) Appl. No.: 17/211,586

(22) Filed: Mar. 24, 2021

(65) Prior Publication Data
US 2021/0301783 A1 Sep. 30, 2021

(30) Foreign Application Priority Data

Mar. 27, 2020 (EP) ..................................... 20166241

(51) Int. Cl.
*F03D 1/06* (2006.01)
(52) U.S. Cl.
CPC ...... *F03D 1/0675* (2013.01); *F05B 2240/302* (2013.01); *F05B 2280/6013* (2013.01)
(58) Field of Classification Search
CPC .... F03D 1/0633; F03D 1/0641; F03D 1/0675; F03D 1/0683; F05B 2240/30; F05B 2280/60
See application file for complete search history.

(56) References Cited

U.S. PATENT DOCUMENTS

| | | | |
|---|---|---|---|
| 6,520,706 B1 * | 2/2003 | McKague, Jr. | ......... B29C 70/48 156/182 |
| 8,828,172 B2 * | 9/2014 | Overgaard | ............ F03D 1/0675 156/324 |
| 9,366,223 B2 | 6/2016 | Nielsen | |
| 10,502,180 B2 | 12/2019 | Gorostidi Martinez de Lecea et al. | |
| 10,730,247 B2 | 8/2020 | Hansen et al. | |
| 2014/0064980 A1 * | 3/2014 | Griesel | .................. F03D 1/0675 156/305 |
| 2014/0322025 A1 | 10/2014 | Barnhart et al. | |
| 2017/0320275 A1 | 11/2017 | De Waal Malefijt et al. | |
| 2018/0238301 A1 * | 8/2018 | Tobin | .................. B29D 99/0028 |

(Continued)

FOREIGN PATENT DOCUMENTS

| | | |
|---|---|---|
| EP | 2570254 A1 | 3/2013 |
| EP | 2591229 B1 | 5/2013 |

(Continued)

*Primary Examiner* — Courtney D Heinle
*Assistant Examiner* — Sang K Kim
(74) *Attorney, Agent, or Firm* — Walter Ottesen, P.A.

(57) ABSTRACT

A shear web for stiffening a rotor blade includes: a first flange for connecting to a first half-shell, a second flange for connecting to a second half-shell, a core having an end facing the first half-shell, a further end facing the second half-shell, a front side facing a profile leading edge, and a rear side facing a profile trailing edge, a layer of reinforcing fibers having a portion on the rear side and a further portion on the first end and extending toward the profile leading edge, such that the further portion forms part of the first flange, and a further layer having a portion arranged on the front side of the core, and a further portion arranged on the second end of the core and extending from there further toward the profile trailing edge, such that the further portion forms part of the second flange.

20 Claims, 4 Drawing Sheets (56) References Cited

U.S. PATENT DOCUMENTS

| | | | |
|---|---|---|---|
| 2019/0145383 A1* | 5/2019 | Christiansen | F03D 1/0675 |
| | | | 416/146 R |
| 2020/0023557 A1 | 1/2020 | Schibsbye et al. | |
| 2020/0095978 A1* | 3/2020 | Rodwell | F03D 1/0675 |

FOREIGN PATENT DOCUMENTS

| | | |
|---|---|---|
| EP | 2881237 A1 | 6/2015 |
| EP | 3165762 A1 | 5/2017 |
| EP | 3396155 A1 | 10/2018 |
| EP | 3486476 A1 | 5/2019 |
| WO | 2016/066816 A1 | 5/2016 |
| WO | 2018/100152 A1 | 6/2018 |

\* cited by examiner

SHEAR WEB FOR STIFFENING A WIND TURBINE ROTOR BLADE

CROSS REFERENCE TO RELATED APPLICATION

This application claims priority of European patent application no. 20 166 241.8, filed Mar. 27, 2020, the entire content of which is incorporated herein by reference.

TECHNICAL FIELD

The disclosure relates to a shear web for stiffening a wind turbine rotor blade. Wind turbine rotor blades have an aerodynamic casing and a support structure. In the constructions dominating today, the wind turbine rotor blades are joined together from two half-shells produced in a fiber composite construction. The support structure includes spar caps which run in the longitudinal direction of the wind turbine rotor blade and are generally integrated in the half-shells. In principle, a separate manufacture of the spar caps and subsequent connection to the half-shells is also possible. In both cases, in the context of the language of the present application the spar caps are understood to be constituent parts of the half-shells. In addition, the support structure includes at least one shear web, which extends in the longitudinal direction of the wind turbine rotor blade and is arranged between the two half-shells.

BACKGROUND

The shear webs are frequently arranged between two spar caps situated opposite one another in pairs. The shear webs lead to a significant stiffening of the blade profile and thus ensure an increase in the buckling strength and relieve the connections between the two half-shells of load. For this purpose, the shear webs themselves have to absorb high loads. In order to allow this with as low a weight as possible, the shear webs are produced generally in a sandwich construction. The use of a single shear web or two shear webs arranged in a box shape is possible. In order to guarantee a good absorption of force between shear web and shell, the shear webs are generally arranged on the spar caps. In the large profiles of the rotor blades that are usual today, the use of a plurality of spar caps is widespread. The arrangement of additional shear webs between the additional spar caps is likewise practiced. In theory, any desired number of shear webs in the rotor blade can be envisaged. Likewise known is the use of an additional so-called closing-off web at a profile trailing edge which is formed as a "thick trailing edge".

Documents U.S. Pat. Nos. 9,366,223; 10,730,247; US 2017/0320275; U.S. Pat. No. 10,502,180; US 2020/0023557; EP 3 396 155 A1; and, EP 3 486 476 A1 have disclosed shear webs, built in a sandwich construction, for stiffening wind turbine rotor blades, in which shear webs different measures have been taken to increase the stability of the connecting regions of the shear webs to the half-shells and/or to simplify the manufacture of the shear webs.

SUMMARY

It is an object of the invention to provide an improved shear web for a wind turbine rotor blade.

The aforementioned object can, for example, be achieved by a shear web which serves to stiffen the wind turbine rotor blade and includes:

a first flange for connecting to a first half-shell of the wind turbine rotor blade, a second flange for connecting to a second half-shell of the wind turbine rotor blade, a core, which extends over a height of the shear web and has a first end face, which faces the first half-shell, a second end face, which faces the second half-shell, a front side face, which faces a profile leading edge of the wind turbine rotor blade, and a rear side face, which faces a profile trailing edge of the wind turbine rotor blade, a first layer of reinforcing fibers having a first portion, which is arranged on the rear side face of the core, and a second portion, which is arranged on the first end face of the core and extends from there further toward the profile leading edge, with the result that the second portion forms a portion of the first flange that faces the profile leading edge, and a second layer of reinforcing fibers having a first portion, which is arranged on the front side face of the core, and a second portion, which is arranged on the second end face of the core and extends from there further toward the profile trailing edge, with the result that the second portion forms a portion of the second flange that faces the profile trailing edge.

The shear web is formed from a sandwich construction, the core being arranged in the interior of the shear web. The cover layers of the sandwich construction consist of a fiber composite material, which includes at least the two layers of reinforcing fibers mentioned. The cover layers can enclose the core on all sides.

The core can include, for example, balsa wood, a foamed plastics material or some other core material or consist of one of the materials. The core can be configured in one part or multiple parts from a single material or using different materials. The core can be substantially disk-like or plate-like. The core extends substantially in the longitudinal direction of the wind turbine rotor blade, specifically over the entire length thereof or part, in particular most, thereof. Orthogonal to the longitudinal direction, the core extends over a height of the shear web that substantially corresponds to a spacing between the two half-shells. Of course, the height of the core may be somewhat smaller than the height of the shear web, in particular because the core is also surrounded by reinforcing fibers at its end faces. The two end faces of the core are arranged directly at or close to the respective flanges. In the case of a centrally arranged shear web, the height of the shear web corresponds approximately to the profile thickness of the rotor blade. The height of the shear web can vary in the longitudinal direction of the shear web in a manner corresponding to the profile thickness of the rotor blade.

The reinforcing fibers may be glass fibers or carbon fibers, for example. A layer of reinforcing fibers may be in particular a woven fabric made of one or more types of the reinforcing fibers or other fibers. However, a use of fibrous sheets or fiber mats or other fibrous semifinished products or combinations thereof, including multiple layers, is also possible.

The shear web can be produced in a vacuum infusion process, that is, by placing the reinforcing fibers and the core into a production mold and subsequently infusing a liquid plastics material under vacuum. As an alternative, the shear web may be produced in a hand lay-up process and/or using preimpregnated fibrous semifinished products (prepregs).

The first flange extends from the first end face in the direction toward the profile leading edge. The portion of the first flange is formed at least partially by the second portion of the first layer. The first flange can additionally include a portion which extends from the first end face in the direction toward the profile trailing edge. The second flange can correspondingly extend from the second end face in the direction toward the profile trailing edge. The portion of the second flange is formed at least partially by the second portion of the second layer. The second flange can additionally include a portion which extends from the second end face in the direction toward the profile leading edge. If both flanges have the additional portions mentioned, the shear web is I-shaped in cross section (that is, transversely to the longitudinal direction). If neither of the two flanges has one of the additional portions mentioned, the shear web is shaped in cross section like an S composed of three approximately straight portions. It is likewise possible that only the first flange or only the second flange includes one of the additional portions mentioned. The flanges can be oriented approximately at right angles to the side faces of the core, but also at an angle which deviates therefrom. In the cross-sectional plane of the shear web, the flanges may run in each case in a straight line or have a curvature which is adapted to the inner contour of an adjoining half-shell.

The first portion of the first layer and/or the first portion of the second layer can extend over the entire height of the core or only over part thereof. The second portion of the first layer and/or the second portion of the second layer can extend over the entire width of the flange portion formed thereby or only over part thereof. All the layers of reinforcing fibers mentioned can extend over the entire length of the core and/or the shear web or only over one or more longitudinal portions of the core and/or shear web.

The disclosure is based at least in part on the finding that, during operation of the wind turbine rotor blade, the shear webs are not only subject to tensile and compressive loading, but that in addition high asymmetric (bending) loads occur, which can lead to damage of the flanges. The damage results in particular from a shearing deformation of the cross section of the wind turbine rotor blade that can occur under strong impact loads. A shearing deformation can even occur when the impact loads act substantially in the direction of the height of the shear web, because the half-shells and/or the support structure of the wind turbine rotor blade can be formed asymmetrically, for example in an asymmetric layout of the half-shells with the aim of bending-torsion coupling. When shearing deformation occurs, the two half-shells are displaced relative to one another in the direction of the profile chord length, thereby leading to tilting of the shear web. As a result, the two cover layers are loaded in opposite directions in the region of a flange. It is possible, for example, for the cover layer which faces the profile leading edge to be subjected to tensile loading, and the cover layer which faces the profile trailing edge to be subjected to compressive loading. This asymmetric loading situation at the flanges of the shear web can in particular lead to failure of the design when tensile loads are introduced into the core as a consequence of delamination of reinforcing fiber layers. In this case, cracks form quickly in the core, it being possible for this to lead to a complete failure of the shear web and consequently also of the entire rotor blade. Repair is in many cases not possible or associated with very high costs.

Figure 7:
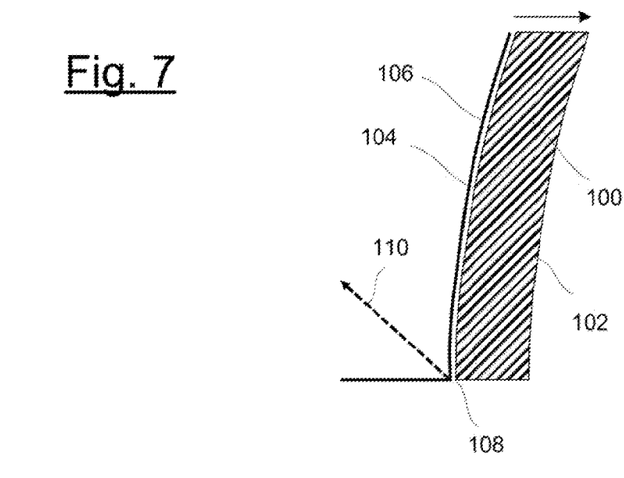
FIG. 7 shows an illustration of a disadvantageous load situation in cross section; and,
FIG. 8 shows an illustration of an advantageous load situation in cross section.
Figure 8:
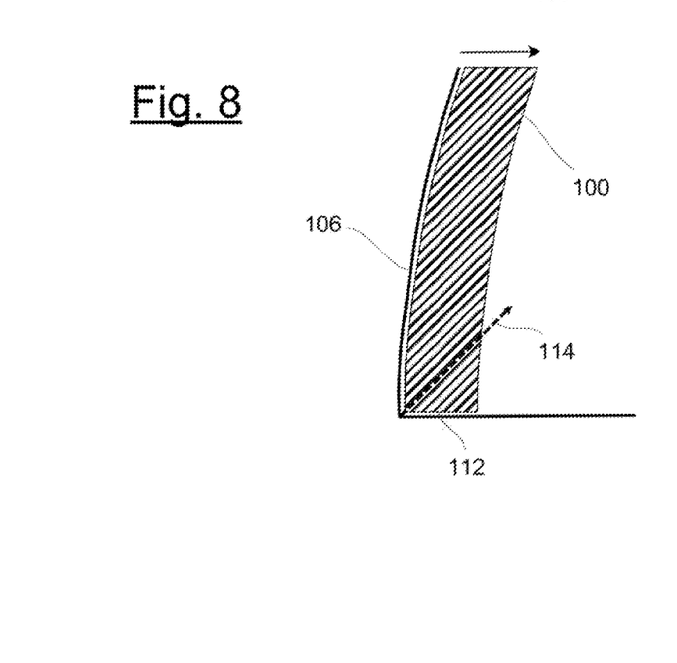

The inventor has recognized that this risk can be considerably reduced by the specific arrangement of the first and second layers of reinforcing fibers. This is explained with reference to FIGS. 7 and 8. FIG. 7 shows elements of the base portion of a shear web in cross section. The shear web is tilted to the right in the figure by a shearing deformation of the wind turbine rotor blade at its upper end. In the base portion of the shear web illustrated, this leads to a compressive load at the side face 102, arranged on the right, and a tensile load at the side face 104, arranged on the left, of the core 100 of the shear web. Arranged at the side face 104 arranged on the left is a layer 106 of reinforcing fibers that is angled away to the left at the bottom of an edge 108 of the core 100 and forms a flange for connection to a half-shell, which half-shell is not illustrated. The dashed arrow 110 illustrates the force acting on the layer 106 in the region of the edge 108. It can be seen that this force can lead to the layer 106 becoming detached from the core 100 in the region of the edge 108. FIG. 8 illustrates the same load situation, however the layer 106 of reinforcing fibers is angled away in the opposite direction at the edge 108, with the result that the layer initially runs along the bottom end face 112 and then forms a flange running in the other direction to that in FIG. 7. The force depicted by the dashed arrow 114 presses the layer 106 of reinforcing fibers against the core 100 in the region of the edge 108. There is no comparable risk of the layer 106 becoming detached.

In the embodiment, the first layer and the second layer are arranged in such a way that the situation of FIG. 8, which can be seen as advantageous, is provided at both flanges when the shear web is arranged in the orientation in the wind turbine rotor blade that matches the shearing deformation which occurs. If as a result of the configuration primarily a shearing deformation occurs, in the case of which a half-shell of the rotor blade that is on the suction side is displaced relative to a half-shell on the pressure side in the direction toward the profile trailing edge, the first flange is connected to the half-shell on the suction side and the second flange is connected to the half-shell on the pressure side. If as a result of the configuration primarily a shearing deformation occurs, in the case of which a half-shell of the rotor blade that is on the suction side is displaced relative to a half-shell on the pressure side in the direction toward the profile leading edge, the first flange is connected to the half-shell on the pressure side and the second flange is connected to the half-shell on the suction side. In this way, in both cases an optimum and durable stiffening of the wind turbine rotor blade is achieved.

In one configuration, the shear web has at least one further first layer of reinforcing fibers that is arranged like the first layer, and/or at least one further second layer of reinforcing fibers that is arranged like the second layer. What is meant by this is that the at least one further layer likewise has a first portion, which is arranged on the rear side face of the core, and a second portion, which is arranged on the first end face of the core and extends from there further toward the profile leading edge, with the result that the second portion forms a portion of the first flange that faces the profile leading edge, and/or that the at least one further layer likewise has a first portion, which is arranged on the front side face of the core, and a second portion, which is arranged on the second end face of the core and extends from there further toward the profile trailing edge, with the result that the second portion forms a portion of the second flange that faces the profile trailing edge. The respective at least one further layer can lie against the first and/or against the second layer or be arranged spaced apart therefrom. The first and second portions may be substantially congruent, but it is also possible that, for example, the first portion of the first layer extends over a larger or smaller portion than the first portion of one of the at least one further layers. In any case, each further layer achieves an additional reinforcement of the shear web in the respective transition region between core and flange.

In one configuration, the first portion of the first layer lies directly against the rear side face and/or the first portion of the second layer lies directly against the front side face and/or the second portion of the first layer lies directly against the first end face and/or the second portion of the second layer lies directly against the second end face. In principle, further materials, in particular one or more other layers of reinforcing fibers, can also be arranged between the portions and faces mentioned. However, if the portions lie directly against the respective faces, a particularly effective protection against delamination in the region of the relevant edge of the core is achieved.

In one configuration, the shear web includes a third layer of reinforcing fibers having a first portion, which is arranged on the rear side face of the core, and a second portion, which forms a portion of the second flange that faces the profile trailing edge, and/or the shear web includes a fourth layer of reinforcing fibers having a first portion, which is arranged on the front side face of the core, and a second portion, which forms a portion of the first flange that faces the profile leading edge. These additional layers are not arranged on one of the end faces of the core. The third layer reinforces the transition between the core and the flange portion formed by the second layer. The fourth layer reinforces the transition between the core and the flange portion formed by the first layer.

In one configuration, the first layer has a third portion, which forms a portion of the second flange that faces the profile trailing edge, and/or the second layer has a third portion, which forms a portion of the first flange that faces the profile leading edge. In this case, the first and/or the second layer extend over the entire height of the core and each contribute to the strength of both flanges.

In one configuration, the shear web includes a fifth layer of reinforcing fibers having a first portion, which is arranged on the rear side face, and a second portion, which forms a portion of the first flange that faces the profile trailing edge, and/or the shear web includes a sixth layer of reinforcing fibers having a first portion, which is arranged on the front side face, and a second portion, which forms a portion of the second flange that faces the profile leading edge. These additional layers each form an additional flange portion, which faces in the opposite direction to the flange portion formed by the first or second layer.

In one configuration, the shear web includes a seventh layer of reinforcing fibers that is arranged on the first end face and extends from there both toward the profile leading edge and toward the profile trailing edge, with the result that the seventh layer forms portions of the first flange that face in opposite directions, and/or the shear web includes an eighth layer of reinforcing fibers that is arranged on the second end face and extends from there both toward the profile leading edge and toward the profile trailing edge, with the result that the eighth layer forms portions of the second flange that face in opposite directions. These layers are well suited for forming a stable shear web which is I-shaped in cross section.

In one configuration, the core has a first edge between the first end face and the rear side face and a second edge between the first end face and the front side face, the first edge being rounded to a more pronounced extent than the second edge, and/or the core has a third edge between the second end face and the front side face and a fourth edge between the second end face and the rear side face, the third edge being rounded to a more pronounced extent than the fourth edge. The relatively pronounced rounding of the first and third edge additionally counteracts the particularly high delamination risk which exists there. In particular, in these regions, the first and/or second layer can be manufactured such that it/they lie particularly precisely against the core, with the result that no potential weak points form as a result of what are known as "resin pockets".

In one configuration, the shear web has a rear additional core, which is arranged on the rear side face of the core and extends only over part of the height of the shear web, with the result that the rear additional core widens the first end face of the core, and/or the shear web has a front additional core, which is arranged on the front side face of the core and extends only over part of the height of the shear web, with the result that the front additional core widens the second end face of the core. The shear web thus deviates from a simple rectangular cross section and is widened asymmetrically in a manner corresponding to the loads which occur. As a result, higher loads can be absorbed in the sensitive regions.

In one configuration, the first layer is arranged between the core and the rear additional core and/or the second layer is arranged between the core and the front additional core.

In this case, the first and/or second layer furthermore in particular brings about increased stability in the region of the respective edge of the core. Moreover, the layer simplifies an optimum connection to the respective additional core.

In one configuration, the shear web includes an additional layer of reinforcing fibers having a first portion, which is arranged on a side face of the rear additional core that faces the profile trailing edge, and a second portion, which is arranged on an end face of the rear additional core, which extends the first end face of the core, and on the first end face of the core and extends from there further in the direction toward the profile leading edge, with the result that the second portion forms a portion of the first flange that faces the profile leading edge, and/or the shear web includes an additional layer of reinforcing fibers having a first portion, which is arranged on a side face of the front additional core that faces the profile leading edge, and a second portion, which is arranged on an end face of the front additional core, which extends the second end face of the core, and on the second end face of the core and extends from there further in the direction toward the profile trailing edge, with the result that the second portion forms a portion of the second flange that faces the profile trailing edge. The additional layers embed the respective additional core and reinforce the construction in a similar manner to what was explained in relation to the first and second layers at the edges of the respective additional core that are likewise particularly at risk of delamination.

In one configuration, in the region of an edge between an end face and an adjoining side face, a surface of the core is roughened and/or provided with a coarser cell structure. As a result, an improved attachment to the adjoining layer of reinforcing fibers (in particular to the first and/or second layer) is achieved. In principle, in the case of sandwich constructions having core materials which are relatively smooth and/or protected by a seal against penetrating liquid plastics material, work is carried out to achieve a low weight. However, a higher proportion of plastic may be expedient at the edges which are particularly at risk of delamination. The higher roughness or coarser cell structure can be achieved in particular by a mechanical or chemical processing of the core in the relevant surface region, for example, by grinding or etching.

In one configuration, a nonwoven of a thermoplastic material is arranged between the core and an adjoining layer of reinforcing fibers and/or between two layers of reinforcing fibers, in each case in particular in the region of an edge between an end face of the core and an adjoining side face of the core. The plastics material may include, for example, PET (polyethylene terephthalate), PA (polyamide) or PP (polypropylene). Nonwovens of this type, also referred to as "veil", are thin enough that they allow the load-optimized arrangement of the reinforcing fibers to be virtually unimpaired. As a consequence, the nonwovens can, however, have a stiffer connection between the adjacent materials.

In one configuration, a wind turbine rotor blade includes a first half-shell, a second half-shell, a longitudinal direction, an aerodynamic profile, which has a profile leading edge and a profile trailing edge, and a shear web, the shear web running in the longitudinal direction and the first flange of the shear web being connected to the first half-shell and the second flange of the shear web being connected to the second half-shell. The connection may be realized as an adhesive bond, but can also be produced by a vacuum infusion process. The two half-shells may in particular be a half-shell on the pressure side and a half-shell on the suction side. The wind turbine rotor blade can be intended for a wind turbine having a rotor with a horizontal axis, it being possible for the rotor to include at least two of the wind turbine rotor blades. The wind turbine rotor blade can have a length of 30 m or more, 50 m or more, 70 m or more, 80 m or more or 90 m or more. The wind turbine rotor blade can moreover be formed as explained in the introduction in relation to the prior art, in particular in terms of the number and arrangement of spar caps and shear webs.

BRIEF DESCRIPTION OF THE DRAWINGS

The invention will now be described with reference to the drawings wherein.

DESCRIPTION OF THE PREFERRED EMBODIMENTS

Figure 1:
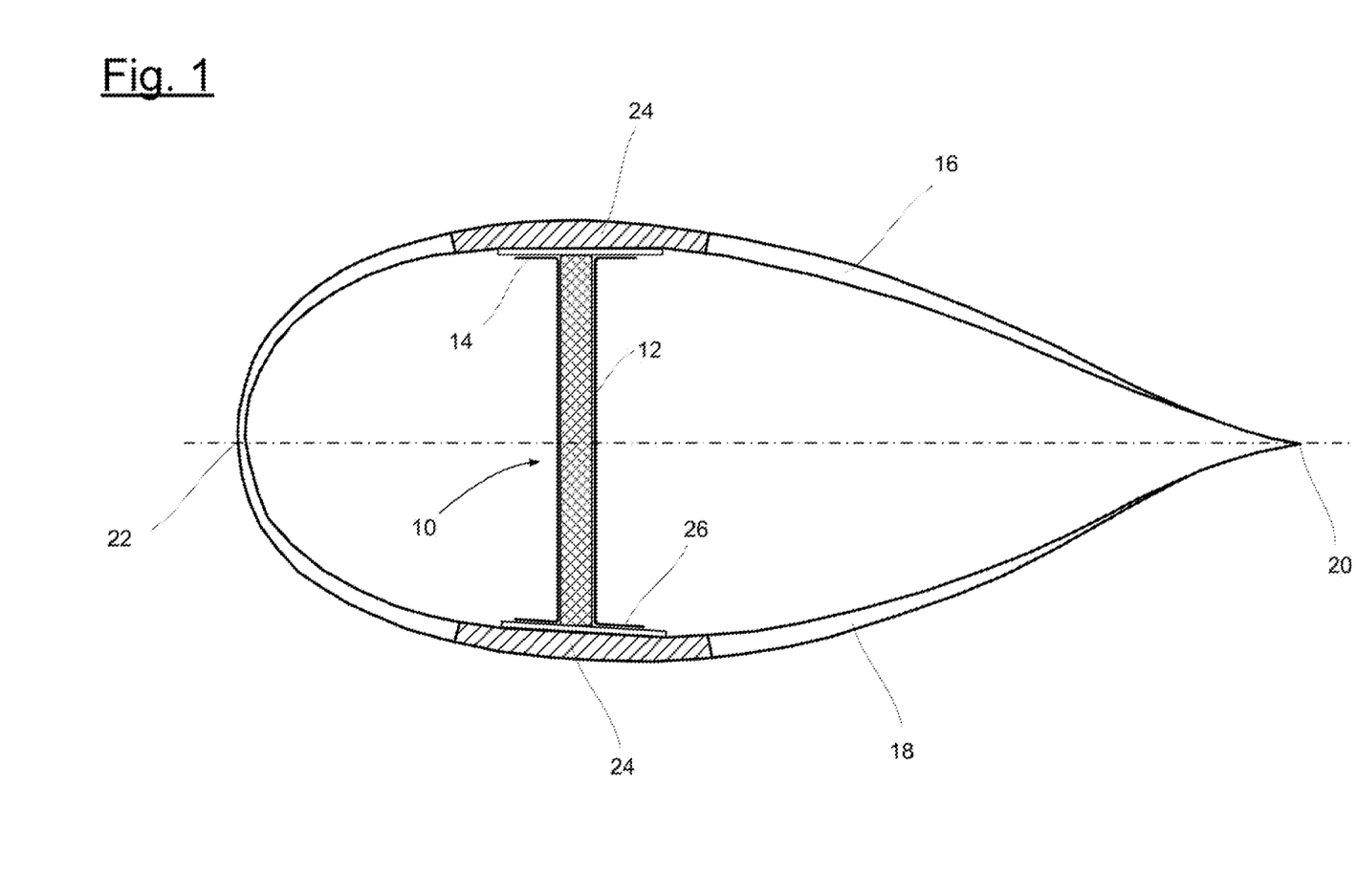
FIG. 1 shows a wind turbine rotor blade in cross section.

The wind turbine rotor blade illustrated in FIG. 1, which is only schematically illustrated in a similar manner to the shear webs in all the other figures, includes a first half-shell 16 and a second half-shell 18. The first half-shell 16 forms the suction side of an aerodynamic profile, and the second half-shell forms the pressure side of the aerodynamic profile. Integrated in each of the two half-shells is a main spar cap 24. The two main spar caps 24 are arranged opposite one another, for instance where the aerodynamic profile is at its thickest. The aerodynamic profile also has a profile trailing edge 20 and a profile leading edge 22, between which a profile chord length is indicated in dashes. The two half-shells are connected to one another at the profile leading edge 20 and at the profile trailing edge 22, for example by an adhesive bond or coinfusion.

A shear web 10 is arranged between the two main spar caps 24. The shear web includes a first flange 14 and a second flange 26, the first flange 14 being connected, for example adhesively bonded, to the first half-shell 16 and the second flange being connected, for example adhesively bonded, to the second half-shell 18. A core 12 of the shear web 10 extends over a height which corresponds substantially to the height of the shear web 10 and at the same time the spacing which is present between the two half-shells 16, 18.

Figure 2:
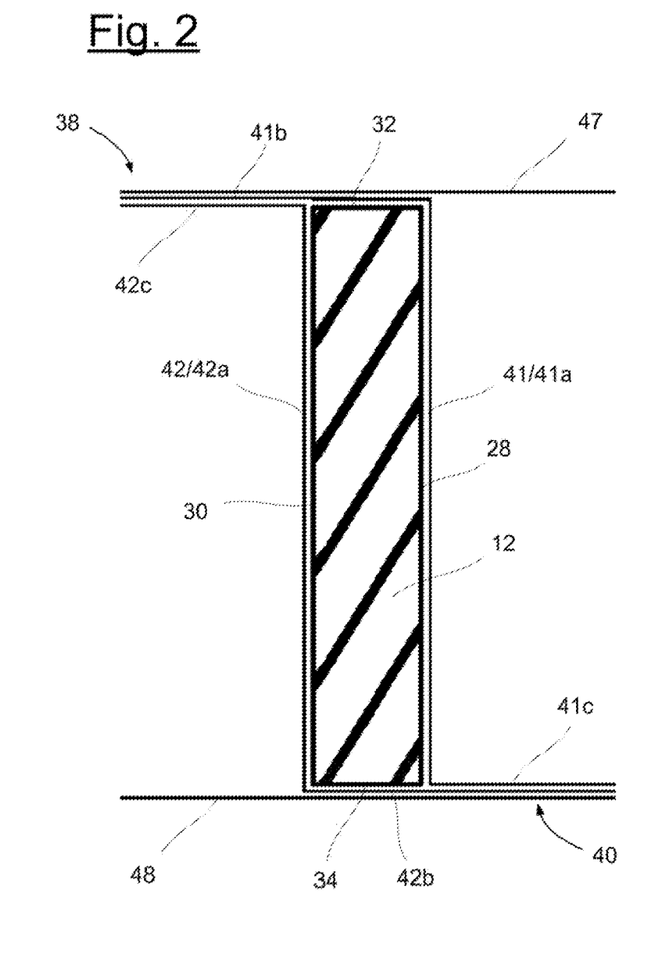
FIG. 2 shows a shear web in cross section.

Further details of the shear web 10 can be seen in a first variant in FIG. 2. It can be seen that the shear web of FIG. 2 is formed as I-shaped in cross section, in a similar manner to the shear webs shown in FIGS. 3 to 6. All the shear webs have a core 12, which consists, for example, of a foamed plastics material. All of the cores 12 shown in FIGS. 2 to 6 have a rear side face 28, a front side face 30, a first end face 32 and a second end face 34. The two side faces 28, 30 each extend over the entire height of the core 12, which corresponds substantially to the entire height of the shear web. All the cores 12 have a substantially disk-like form and have a rectangular base shape in cross section.

The two end faces 32, 34 each extend in this case substantially over the entire thickness of the core 12.

Substantial differences exist in terms of the use of reinforcing fibers. A first layer 41 having three portions can be seen in FIG. 2. A first portion 41a is arranged on the rear side face 28, a second portion 41b is arranged on the first end face 32 and extends from there further in the direction toward the profile leading edge 22. Although not depicted in any of FIGS. 2 to 6, the profile leading edge 22 is always situated on the left and the profile trailing edge 20 is always situated on the right of the respectively illustrated shear web. The second portion 41b of the first layer 41 thus forms a portion of the first flange 38, which is arranged at the top in FIG. 2. Furthermore, the first layer 41 has a third portion 41c, which is angled away in the direction toward the profile trailing edge 20 at the edge between the rear side face 28 and second end face 34 and forms a portion of the second flange 40.

The shear web from FIG. 2 furthermore includes a second layer 42 of reinforcing fibers that likewise has three portions. A first portion 42a is arranged on the front side face 30. A second portion 42b is arranged on the second end face 34 and extends from there further in the direction toward the profile trailing edge 20, the second portion forming a portion of the second flange 40. A third portion 42c runs parallel to a part of the second portion 41b of the first layer 41 and thus likewise forms a portion of the first flange 38. Furthermore, the shear web from FIG. 2 includes a seventh layer 47 of reinforcing fibers that is arranged on the first end face 32 and extends from there both toward the profile leading edge 22 and toward the profile trailing edge 20, with the result that the seventh layer forms portions of the first flange 38 that face in opposite directions. The shear web moreover has an eighth layer 48 of reinforcing fibers on the opposite side, which is illustrated at the bottom in FIG. 2. The eighth layer is arranged on the second end face 34 and extends from there both toward the profile leading edge 22 and toward the profile trailing edge 20, with the result that the eighth layer forms portions of the second flange 40 that face in opposite directions.

In FIG. 2, the first portion 41a of the first layer 41 lies directly against the rear side face 28, the first portion 42a of the second layer 42 lies directly against the front side face 30, the second portion 41b of the first layer 41 lies directly against the first end face 32 and the second portion 42*b* of the second layer 42 lies directly against the second end face 34.

Figure 3:
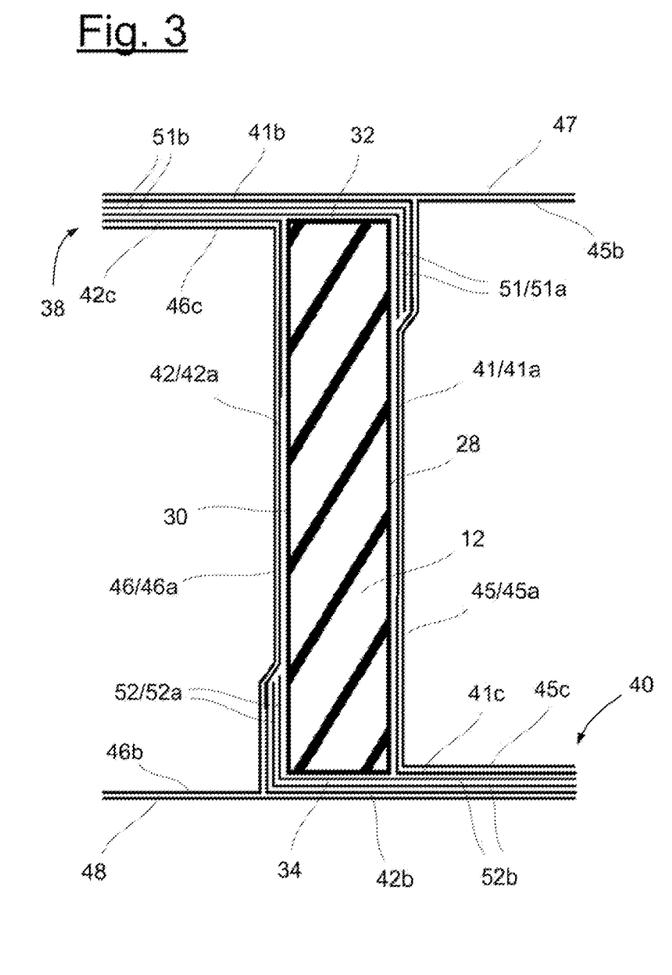
FIG. 3 shows a further shear web having a greater number of layers in cross section.

Likewise, all of the layers of reinforcing fibers described in relation to FIG. 2 are in the example of FIG. 3. The layers are provided with the same reference signs in FIG. 3 as in FIG. 2 and are not explained again. In addition, there are two further first layers 51 and two further second layers 52. The further first layers 51 each have a first portion 51*a*, which is arranged on the rear side face 28, but differently to the first portion 41*a* of the first layer 41 extends only over part of the height of the core 12. Moreover, the two first layers 51 each have a second portion 51*b*, which runs parallel to the second portion 41*b* of the first layer 41. The two further second layers 52 are arranged mirror-symmetrically with respect to the two further first layers 51 and their respective first and second portions are provided with the reference signs 52*a* and 52*b*.

As FIG. 3 shows, the first portions 51*a* of the two further first layers 51 are arranged between the rear side face 28 and the first portion 41*a* of the first layer. The first portion 41*a* of the first layer, in a similar manner to the second portion 41*b* of the first layer, thus does not lie directly against the rear side face 28 or against the first end face 32. This applies correspondingly for the arrangement of the two further second layers 52.

FIG. 3 furthermore shows a fifth layer 45 of reinforcing fibers that likewise has three portions. A first portion 45*a* is arranged on the rear side face 28, a second portion 45*b* forms a portion of the first flange 38 that faces the profile trailing edge 20, and a third portion 45*c* forms a portion of the second flange 40 that likewise faces the profile trailing edge 20. The shear web from FIG. 3 furthermore includes a sixth layer 46 of reinforcing fibers that likewise has three portions 46*a*, 46*b* and 46*c*. The portions are arranged mirror-symmetrically with respect to the portions 45*a*, 45*b* and 45*c* of the fifth layer 45 explained, that is, against the front side face 30 and in each case facing the profile leading edge 22.

Figure 4:
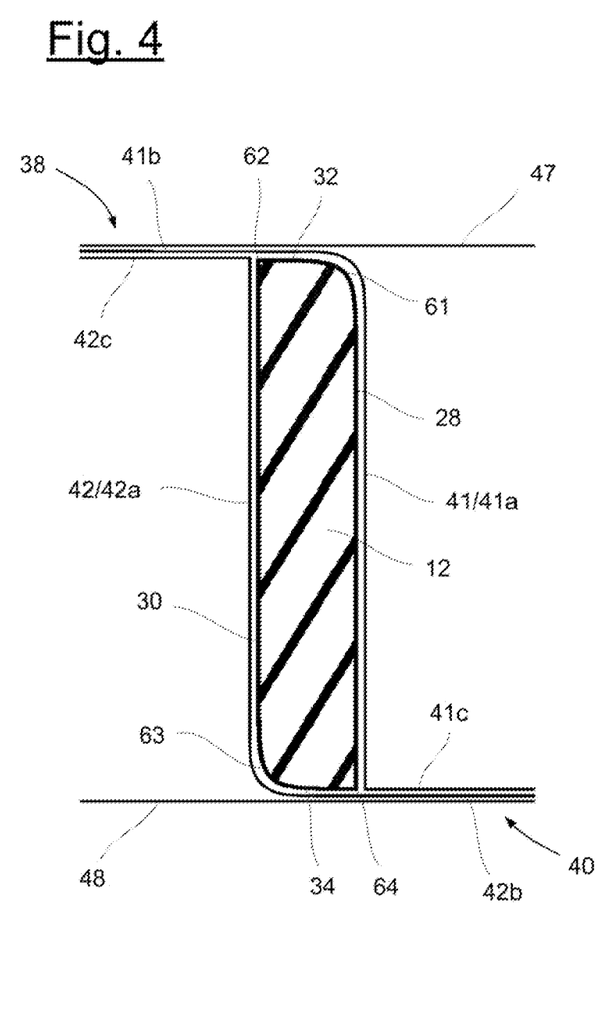
FIG. 4 shows a further shear web having a differently shaped core in cross section.

FIG. 4 differs from the example of FIG. 2 by the different shaping of the core 12. The core has a first edge 61 between the rear side face 28 and the first end face 32, a second edge 62 between the first end face 32 and the front side face 30, a third edge 63 between the front side face 30 and the second end face 34, and a fourth edge 64 between the second end face 34 and the rear side face 28. The first edge 61 is rounded to a more pronounced extent than the second edge 62 and the third edge is rounded to a more pronounced extent than the fourth edge 64. The second edge 62 and the fourth edge 64 have a more or less sharp-edged configuration and/or are provided only with a small radius. The first edge 61 and the third edge 63 are both rounded with the same, relatively large radius.

In terms of the layers of reinforcing fibers, FIG. 4 does not differ from FIG. 2 and all the layers are provided with the same reference signs as in FIG. 2. Deviating from FIG. 2, the respective layers are arranged on the first edge 61 and on the third edge 63 but in a manner following the course which is rounded to a pronounced extent. The layers lie closely against the surface of the core 12.

Figure 5:
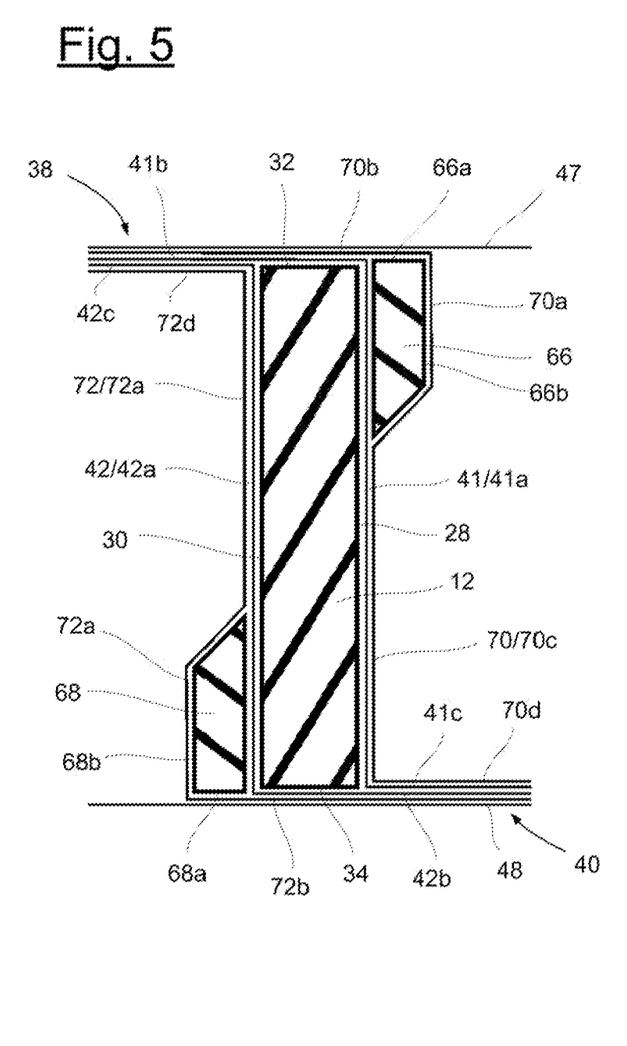
FIG. 5 shows yet a further shear web having a core and two additional cores in cross section.

In addition to the core 12, which is formed like the one in FIG. 2, the shear web from FIG. 5 has a rear additional core 66 and a front additional core 68. The rear additional core 66 is arranged on the rear side face 28 of the core and extends only over part of the height of the shear web. The rear additional core has an end face 66*a*, which widens the end face 32, and a rear side face 66*b* which faces the profile trailing edge 20. The front additional core 68 is formed mirror-symmetrically with respect to the rear additional core 66 and has an end face 68*a*, which widens the second end face 34, and a front side face 68*b* which faces the profile leading edge 22.

In terms of the reinforcing fibers, the shear web from FIG. 5 has all the layers which were described in relation to FIG. 2. The layers are in turn provided with the same reference signs. It can be seen that the first portion 41*a* of the first layer 41 runs between the core 12 and the rear additional core 66, in a similar manner as the first portion 42*a* of the second layer 42 runs between the core 12 and the front additional core 68. Moreover, the shear web from FIG. 5 includes two additional layers of reinforcing fibers. One additional layer 70 of reinforcing fibers has a first portion 70*a*, which is arranged on the rear side face 66*b*, and a second portion 70*b*, which is arranged on the end face 66*a* and extends from there further in the direction toward the profile leading edge, with the result that the second portion contributes to that part of the first flange 38 which faces in this direction. The additional layer 70 moreover has a third portion 70*c*, which is arranged on the rear side face 28, and a fourth portion 70*d*, which runs parallel to the third portion 41*c* of the first layer. A further additional layer 72 is arranged mirror-symmetrically with respect to the additional layer 70. The corresponding portions are denoted 72*a*, 72*b*, 72*c* and 72*d*.

Figure 6:
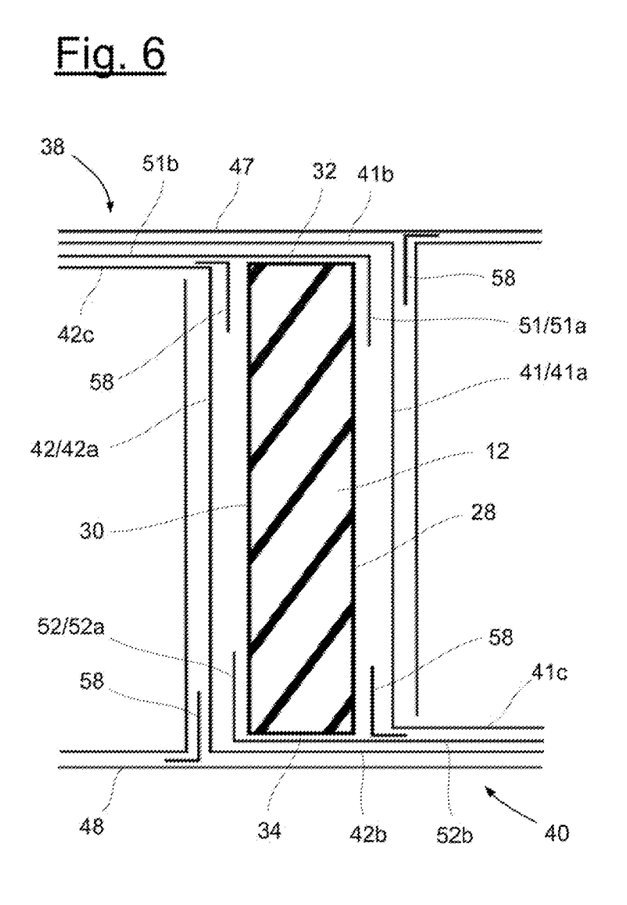
FIG. 6 shows yet a further shear web having a plurality of nonwoven elements in cross section.

FIG. 6 shows a shear web with a core 12, with a first layer 41 of reinforcing fibers having three portions 41*a*, 41*b* and 41*c*, with a second layer of reinforcing fibers 42 having three portions 42*a*, 42*b* and 42*c*, with a seventh layer 47 of reinforcing fibers and with an eighth layer 48 of reinforcing fibers. These layers are arranged as described in relation to FIG. 2.

Moreover, there is a further first layer 51 with portions 51*a* and 51*b*, and also a further second layer 52 with portions 52*a* and 52*b*. These layers are arranged as described in relation to FIG. 3. Furthermore, there is a fifth layer 45 with a first portion 45*a* and a second portion 45*b*, and also a sixth layer 46 with a first portion 46*a* and a second portion 46*c*. These layers are arranged as described in relation to FIG. 3. Deviating from this, however, each of the layers does not have a third portion.

A feature of FIG. 6 is that, in the region of the edges of the core 12, portions of a nonwoven 58 of a thermoplastic material are arranged in each case between the core 12 and one of the layers described or between two of the layers described.

It is understood that the foregoing description is that of the preferred embodiments of the invention and that various changes and modifications may be made thereto without departing from the spirit and scope of the invention as defined in the appended claims.

LIST OF REFERENCE SIGNS

10 Shear web
12 Core
14 First flange
16 First half-shell
18 Second half-shell
20 Profile trailing edge
22 Profile leading edge
24 Main spar cap
26 Second flange
28 Rear side face
30 Front side face
32 First end face
34 Second end face 38 First flange
40 Second flange
41 First layer
41a/41b/41c First/second/third portion of the first layer
42 Second layer
42a/42b/42c First/second/third portion of the second layer
45 Fifth layer
45a/45b/45c First/second/third portion of the fifth layer
46 Sixth layer
46a/46b/46c First/second/third portion of the sixth layer
47 Seventh layer
48 Eighth layer
51 Further first layer
51a/51b First/second portion of the further first layer
52 Further second layer
52a/52b First/second portion of the further second layer
58 Nonwoven
61 First edge
62 Second edge
63 Third edge
64 Fourth edge
66 Rear additional core
66a End face
66b Side face
68 Front additional core
68a End face
68b Side face
70 Additional layer
70a/70b/70c/70d First/second/third/fourth portion of the additional layer
72 Additional layer
72a/72b/72c/72d First/second/third/fourth portion of the additional layer
100 Core
102 Side face
104 Side face
106 Layer
108 Edge
110 Arrow
112 End face
114 Arrow

What is claimed is:

1. A shear web for stiffening a wind turbine rotor blade, the shear web comprising:
a first flange configured to connect to a first half-shell of the wind turbine rotor blade;
a second flange configured to connect to a second half-shell of the wind turbine rotor blade;
a core extending over a height of the shear web;
said core having a first end face configured to face the first half-shell, a second end face configured to face the second half-shell, a front side face configured to face a profile leading edge of the wind turbine rotor blade, and a rear side face configured to face a profile trailing edge of the wind turbine rotor blade;
a first layer of reinforcing fibers having a first portion, which is arranged on said rear side face of said core, and a second portion arranged on said first end face of said core and extending from said first end face further toward said profile leading edge, such that said second portion forms a portion of said first flange that faces said profile leading edge; and,
a second layer of reinforcing fibers having a first portion, which is arranged on said front side face of said core, and a second portion arranged on said second end face of said core and extending from said second end face of said core further toward said profile trailing edge, such that said second portion forms a portion of said second flange that faces said profile trailing edge.

2. The shear web of claim 1 further comprising at least one of a further first layer of reinforcing fibers arranged on said rear side face of said core and a further second layer of reinforcing fibers that is arranged on said first end face of said core and extends from said first end face further toward said profile leading edge.

3. The shear web of claim 1, wherein said first portion of said first layer lies directly against said rear side face, and/or wherein said first portion of said second layer lies directly against the front side face, and/or wherein said second portion of said first layer lies directly against said first end face, and/or wherein said second portion of said second layer lies directly against said second end face.

4. The shear web of claim 1 further comprising at least one of a third layer of reinforcing fibers and a fourth layer of reinforcing fibers, wherein said third layer of reinforcing fibers has a first portion arranged on said rear side face of said core and a second portion which forms a portion of said second flange that faces the profile trailing edge; and, wherein said fourth layer of reinforcing fibers has a first portion arranged on said front side face of said core and a second portion which forms a portion of said first flange that faces the profile leading edge.

5. The shear web of claim 1, wherein said first layer has a third portion, which forms a portion of said second flange which faces the profile trailing edge; and, said second layer has a third portion, which forms a portion of said first flange that faces the profile leading edge.

6. The shear web of claim 1, wherein said first layer has a third portion, which forms a portion of said second flange which faces the profile trailing edge.

7. The shear web of claim 1, wherein said second layer has a third portion, which forms a portion of said first flange that faces the profile leading edge.

8. The shear web of claim 1 further comprising at least one of a fifth layer of reinforcing fibers and a sixth layer of reinforcing fibers; wherein said fifth layer of reinforcing fibers has a first portion, which is arranged on said rear side face, and a second portion, which forms a portion of said first flange that faces the profile trailing edge; and, wherein said sixth layer of reinforcing fibers has a first portion, which is arranged on said front side face, and a second portion, which forms a portion of said second flange that faces the profile leading edge.

9. The shear web of claim 1 further comprising at least one of a seventh layer of reinforcing fibers and an eight layer of reinforcing fibers; said seventh layer of reinforcing fibers being arranged on said first end face and extending from said first end face both toward the profile leading edge and toward the profile trailing edge, such that said seventh layer forms portions of said first flange that face in opposite directions; and, said eighth layer of reinforcing fibers being arranged on said second end face and extending from said second end face both toward the profile leading edge and toward the profile trailing edge, such that said eighth layer forms portions of said second flange that face in opposite directions.

10. The shear web of claim 1, wherein said core has a first edge between said first end face and said rear side face and a second edge between said first end face and said front side face, said first edge being rounded to a more pronounced extent than said second edge.

11. The shear web of claim 1, wherein said core has a third edge between said second end face and said front side face and a fourth edge between said second end face and said rear side face, said third edge being rounded to a more pronounced extent than said fourth edge.

12. The shear web of claim 1, wherein said core has a first edge between said first end face and said rear side face and a second edge between said first end face and said front side face, said first edge being rounded to a more pronounced extent than said second edge; and, wherein said core has a third edge between said second end face and said front side face and a fourth edge between said second end face and said rear side face, said third edge being rounded to a more pronounced extent than said fourth edge.

13. The shear web of claim 1 further comprising at least one of a rear additional core, which is arranged on said rear side face and extends only over part of the height of the shear web, such that said rear additional core widens said first end face, and a front additional core, which is arranged on said front side face of said core and extends only over part of the height of the shear web, such that said front additional core widens said second end face.

14. The shear web of claim 13, wherein said first layer is arranged between said core and said rear additional core and/or wherein said second layer is arranged between said core and said front additional core.

15. The shear web of claim 1 further comprising:
a rear additional core, which is arranged on said rear side face and extends only over part of the height of the shear web, such that said rear additional core widens said first end face;
a front additional core, which is arranged on said front side face of said core and extends only over part of the height of the shear web, such that said front additional core widens said second end face;
an additional layer of reinforcing fibers having a first portion, which is arranged on a side face of said rear additional core that faces the profile trailing edge, and a second portion, which is arranged on an end face of said rear additional core, which extends said first end face of said core, and said second portion is further arranged on said first end face of said core and extends from said first end face of said core further in the direction toward the profile leading edge, such that said second portion forms a portion of said first flange that faces the profile leading edge; and,
a further layer of reinforcing fibers having a first portion, which is arranged on a side face of the front additional core that faces the profile leading edge, and a second portion, which is arranged on an end face of said front additional core, which extends said second end face of said core, and said second portion is further arranged on said second end face of said core and extends from said second end face further in the direction toward the profile trailing edge, such that said second portion forms a portion of said second flange that faces the profile trailing edge.

16. The shear web of claim 1 further comprising:
a rear additional core, which is arranged on said rear side face and extends only over part of the height of the shear web such that said rear additional core widens said first end face; and,
an additional layer of reinforcing fibers having a first portion, which is arranged on a side face of said rear additional core that faces the profile trailing edge, and a second portion, which is arranged on an end face of said rear additional core, which extends said first end face of said core, and said second portion is further arranged on said first end face of said core and extends from said first end face of said core further in the direction toward the profile leading edge, such that said second portion forms a portion of said first flange that faces the profile leading edge.

17. The shear web of claim 1 further comprising
a front additional core, which is arranged on said front side face of said core and extends only over part of the height of the shear web such that said front additional core widens said second end face; and,
a further layer of reinforcing fibers having a first portion, which is arranged on a side face of the front additional core that faces the profile leading edge, and a second portion, which is arranged on an end face of said front additional core, which extends said second end face of said core, and said second portion is further arranged on said second end face of said core and extends from said second end face further in the direction toward the profile trailing edge, such that said second portion forms a portion of said second flange that faces the profile trailing edge.

18. The shear web of claim 1, wherein, in a region of an edge between one of said first end face and said second end face and an adjoining one of said front side face and said rear side face, said core has a surface which is at least one of roughened and provided with a coarser cell structure.

19. The shear web of claim 1 wherein a nonwoven of a thermoplastic material is arranged in at least one of: between said core and an adjoining layer of said reinforcing fibers, and between two layers of said reinforcing fibers, in each case in a region of an edge between one of said first end face and said second end face and an adjoining one of said front side face and said rear side face.

20. A wind turbine rotor blade comprising:
a first half-shell;
a second half-shell;
the wind turbine rotor blade defining a longitudinal direction;
an aerodynamic profile having a profile leading edge and a profile trailing edge;
a shear web for stiffening a wind turbine rotor blade, said shear web having a first flange, a second flange, a core, a first layer of reinforcing fibers, and a second layer of reinforcing fibers;
said core extending over a height of said shear web;
said core having a first end face configured to face the first half-shell, a second end face configured to face the second half-shell, a front side face configured to face a profile leading edge of the wind turbine rotor blade, and a rear side face configured to face a profile trailing edge of the wind turbine rotor blade;
said first layer of reinforcing fibers having a first portion, which is arranged on said rear side face of said core, and a second portion arranged on said first end face of said core and extending from said first end face further toward said profile leading edge, such that said second portion forms a portion of said first flange that faces said profile leading edge;
said second layer of reinforcing fibers having a first portion, which is arranged on said front side face of said core, and a second portion arranged on said second end face of said core and extending from said second end face of said core further toward said profile trailing edge, such that said second portion forms a portion of said second flange that faces said profile trailing edge; and,
said shear web running in the longitudinal direction and said first flange of said shear web being connected to said first half-shell and said second flange of said shear web being connected to said second half-shell.

\* \* \* \* \*